(12) United States Patent
Pirjaberi

(10) Patent No.: US 6,833,876 B1
(45) Date of Patent: Dec. 21, 2004

(54) USING A REDUCED MEMORY LOOK UP TABLE FOR GAMMA CORRECTION THROUGH INTERPOLATION

(75) Inventor: Mohammad R. Pirjaberi, San Jose, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 09/504,463

(22) Filed: Feb. 16, 2000

(51) Int. Cl.[7] .......................... H04N 5/202; H04N 9/69
(52) U.S. Cl. ..................................... 348/674; 348/675
(58) Field of Search .................................. 348/671, 674, 348/675, 676, 677, 254, 255, 256; 382/169; 358/519; 345/601, 602; H04N 5/202, 9/69

(56) References Cited

U.S. PATENT DOCUMENTS

| | | |
|---|---|---|
| 4,394,688 A | 7/1983 | Iida et al. |
| 4,786,968 A | 11/1988 | Kutner |
| 5,012,163 A | 4/1991 | Alcorn et al. |
| 5,175,621 A | 12/1992 | Maesato |
| 5,282,036 A | 1/1994 | Worley, Jr. et al. |
| 5,422,738 A | 6/1995 | Ishihara et al. |
| 5,951,625 A * | 9/1999 | Duvanenko et al. ......... 708/290 |
| 6,166,781 A * | 12/2000 | Kwak et al. ................ 348/674 |

FOREIGN PATENT DOCUMENTS

| | | |
|---|---|---|
| JP | 5145942 | 6/1993 |
| JP | 654257 | 2/1994 |
| JP | 6230760 | 8/1994 |
| JP | 7175447 | 7/1995 |
| JP | 8307714 | 11/1996 |
| JP | 10145641 | 5/1998 |
| JP | 10150566 | 6/1998 |

* cited by examiner

Primary Examiner—Sherrie Hsia
(74) Attorney, Agent, or Firm—Parsons Hsue & de Runtz LLP

(57) ABSTRACT

A method of CRT gamma correction of n-bit color and corresponding device are presented which employ a reduced size lookup table. An n-bit input signal is separated into its m most significant bits and (n−m) least significant bits. Instead of using its full n-bit value as the input address into a $2^n \times n$ lookup table, a $2^m \times n$ table employing only the m most significant bits is used, thereby reducing the memory requirements for the lookup table by a factor of $2^{(n-m)}$. Every cycle, two consecutive memory locations are read, starting from where in the lookup table the m most significant bits of the input signal are pointing. The output of the lookup table provides the n-bit gamma corrected values for each of these m-bit inputs. A interpolation is then formed between these two output values and the n-bit, gamma corrected value of the full n-bit value of the input signal is then interpolated using its (m−n) least significant bits.

19 Claims, 2 Drawing Sheets

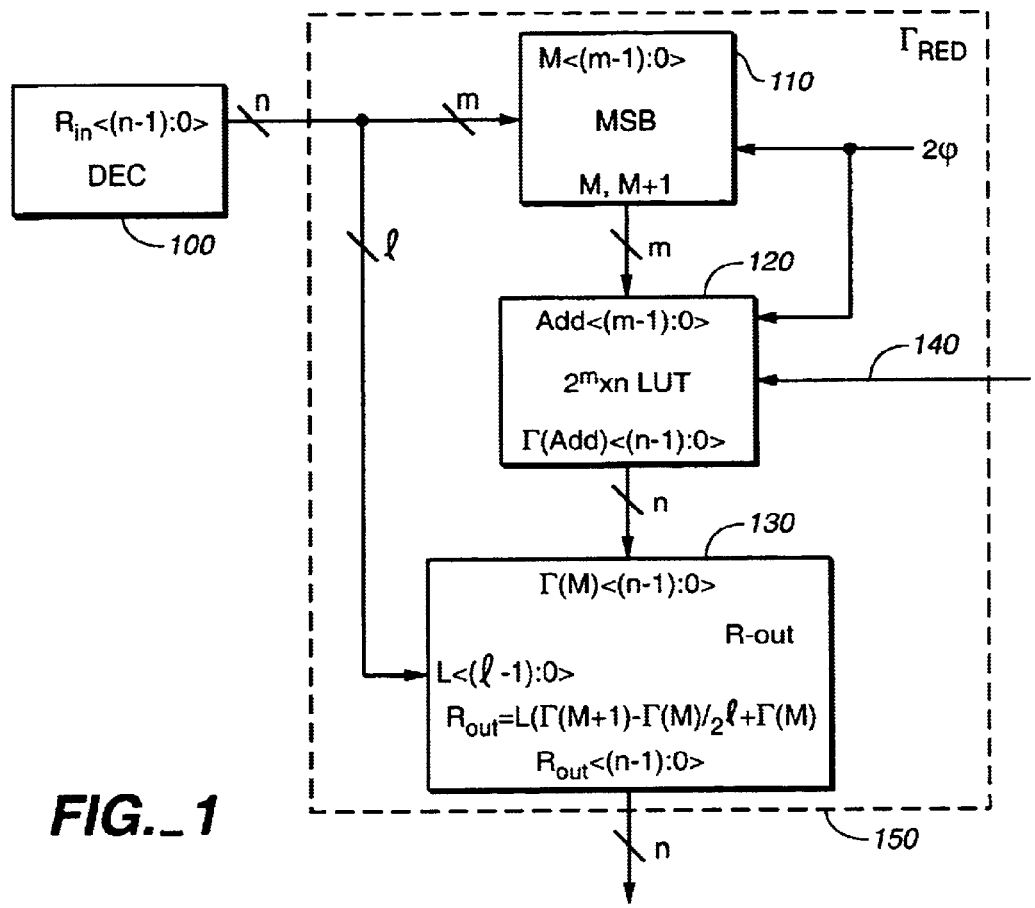
FIG._1
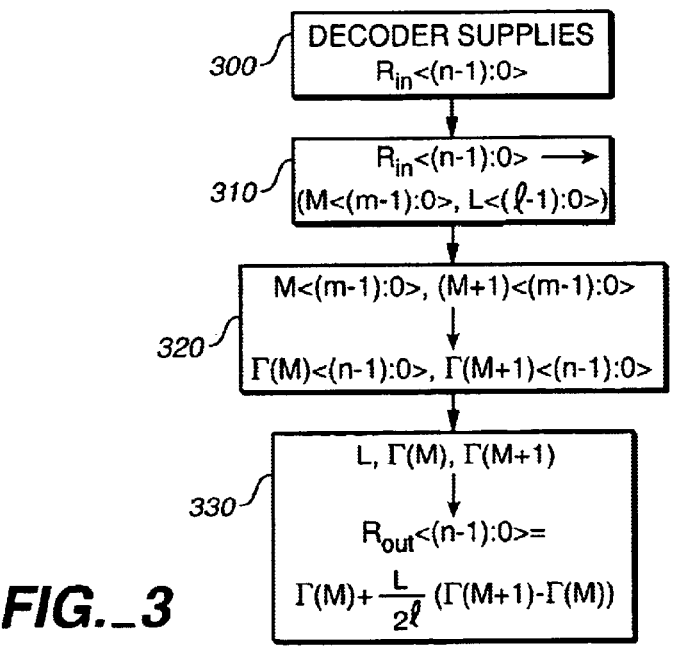
FIG._3

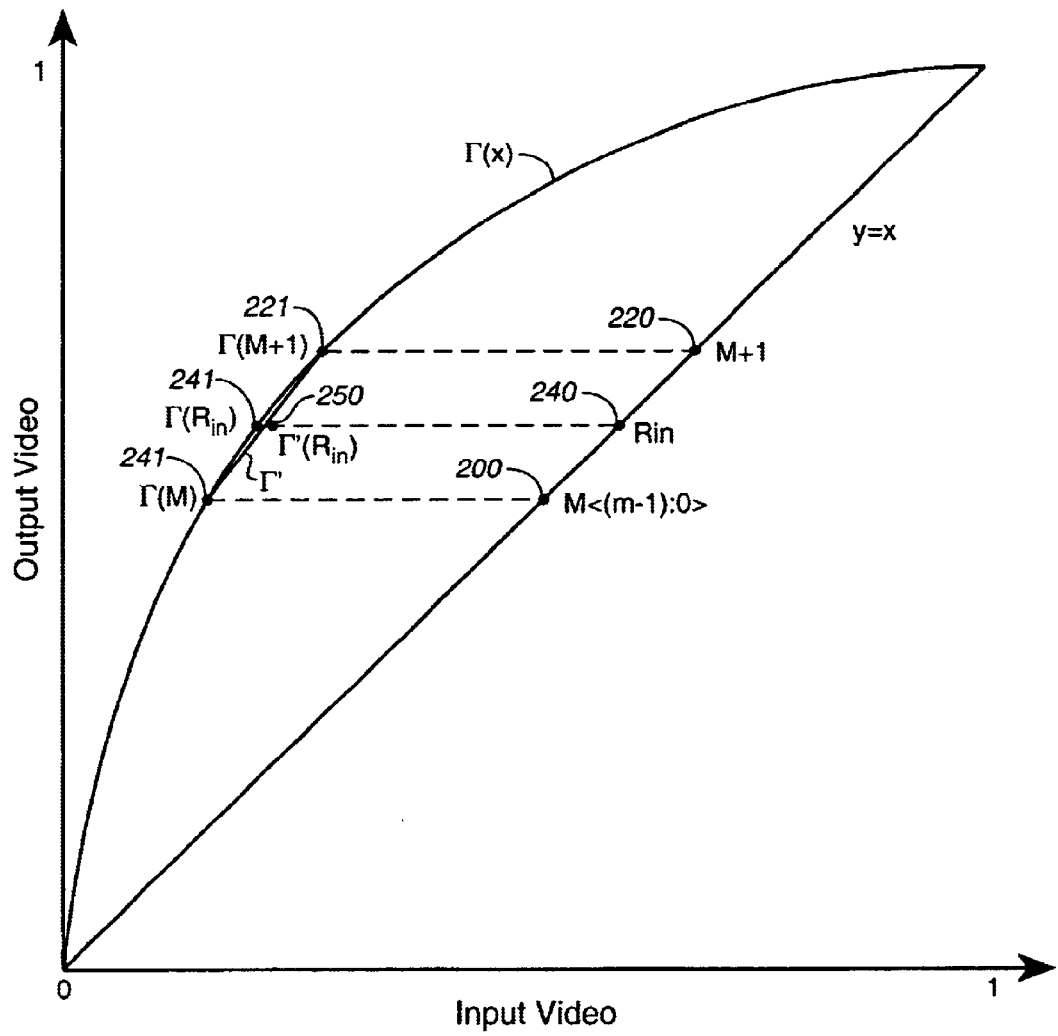
FIG._2

USING A REDUCED MEMORY LOOK UP TABLE FOR GAMMA CORRECTION THROUGH INTERPOLATION

BACKGROUND OF THE INVENTION

This invention relates to video systems, and more specifically, to gamma correction of video intensity values for causing a linear range of video intensity values to be displayed on a cathode ray tube screen as a linear gradation of color intensities.

In a video display, the relation of the magnitude of the output signal, y, to the magnitude of the input signal, x, is expressed in the relationship y=f(x), where f(x) is some non-linear function due to the non-linear response of the cathode ray tube (CRT), as well as any other non-linearities that occur in the system. This relation is most easily expressed in normalized form as $f(x)=x^\gamma$, with the parameter $\gamma$ incorporating the composite non-linearities of the signal reproduction. In an ideal, distortionless system, the overall value of gamma would be unity, $\gamma=1$, and the relationship between the brightness of a portion of an object and the brightness of the corresponding image would be strictly proportional.

To compensate for this non-linear response, the techniques of gamma correction are used. CRT gamma correction is a complex task that is highly dependent a manufacturer's color philosophy. Traditionally, analog methods are used to perform gamma correction by providing phosphor characteristics equations, thereby letting the manufacture set the $\gamma$ values. The needed correction can then be explicitly computed. However, using this method for digital video signals is complicated, as the gamma correction function is exponential, and digital correction can be time consuming. Furthermore, this method would limit the manufacture to the supplied correction curve and take away any flexibility in the correction process.

Another method of performing gamma correction on a digitized intensity signal is to translate each of the N-bit red, green, and blue color intensity values to compensated N-bit color intensity values by using a color lookup table. This allows the manufacturer to program the lookup table to any desired values, using their digital television controller in TV applications or by storing a set in of values in ROM or other memory for computer graphic applications. The lookup table is typically stored in a solid state memory and includes a range of color intensity values, each of which is associated with a corresponding gamma corrected value. These gamma corrected values are derived from the functional relationship above and stored in the lookup table. The gamma corrected values read from the table are then converted into analog intensity signals, which are then applied to a control grid of the CRT.

In the lookup table approach, the integrated circuit must be designed with enough additional memory to support a full lookup table as well as any digital television controller interconnect and ROM requirements. For N-bit color, this requires $2^N \times N$ bits of memory for each color. For the example of 10-bit RGB color, this amounts to $3 \times 1024 \times 10$ bits, a very large and costly amount of memory space to place on a television controller.

SUMMARY OF THE PRESENT INVENTION

A method of CRT gamma correction of n-bit color is presented which employs a reduced size lookup table. An n-bit input signal is separated into its m most significant bits and (n−m) least significant bits. Instead of using its full n-bit value as the input address into a $2^n \times n$ lookup table, a $2^m \times n$ table employing only the m most significant bits is used, thereby reducing the memory requirements for the lookup table by a factor of $2^{(n-m)}$. Every cycle, two consecutive memory locations are read, starting from where in the lookup table the m most significant bits of the input signal are pointing. The output of the lookup table provides the n-bit gamma corrected values programmed in by the digital television controller or loaded from computer memory for each of these m-bit inputs. An approximation, preferably linear, of the gamma correction curve is then formed between these two output values and the n-bit, gamma corrected value of the full n-bit value of the input signal is then interpolated using its (n−m) least significant bits.

Additional objects, advantages, and features of the present invention will become apparent from the following description of its preferred embodiments, which description should be taken in conjunction with the accompanying drawings.

BRIEF DESCRIPTION OF THE DRAWINGS

FIG. 1 is a block diagram of an embodiment of the present invention.

FIG. 2 is a graph of input video versus output video that illustrates the concept employed in the device of FIG. 1.

FIG. 3 is a flow chart describing how the device of FIG. 1 performs the steps described with respect to FIG. 2.

DESCRIPTION OF THE PREFERRED EMBODIMENT

FIG. 1 is a block diagram embodying the present invention which is suitable for TV, computer graphics, and other applications of gamma correction techniques. The diagram shows the gamma correction circuit for n-bit color for the red (R) signal only. Similar circuits for green (G) and blue (B) are suppressed to simplify the description. A graphics engine or TV decoder DEC 100 produces the n-bit signal $R_{in}$<(n−1):0>, with the m most significant bits going to block 110 and the l least significant bits going to block 130, where n=m+l. In block 110, the m most significant bits of the signal $R_{in}$<(n−1):0> are treated as the m-bit value M<(m−1):0>, which is computed along with M+1. Both of these values are then passed on to lookup table block LUT 120, where they serve as input address in a $2^m \times n$ gamma correction lookup table. Preferably, the values contained in the lookup table can be programmed, loaded in along input 140. Both of these n-bit gamma corrected values then go to block 130. In order to supply this pair of gamma corrected values, based upon M and M+1, for each single value of the l least significant bits, blocks 110 and 120 are incremented with twice the clock speed. Within block 130, the n-bit gamma corrected value for the n-bit input signal $R_{in}$<(n−1):0> is then approximated by a an interpolation between the two from the lookup table in LUT 120 by using the l least significant bits of the full, n-bit value. The n-bit gamma corrected signal is then ready for digital to analog conversion or any subsequent post-processing, such as upsampling.

The function of FIG. 1 is described in more detail below, but first the underlying concept of this circuit is described with respect to FIG. 2.

FIG. 2 shows an input video versus output video response curve, $\Gamma$, here modelled as $y=x^\gamma$, where $0 \leq y \leq 1$ and (as is typical) $\gamma<1$, as well as the ideal linear response of y=x. For an input value $R_{in}$, point 240, gamma correction requires knowing the corresponding point $\Gamma(R_{in})$ 241 on the actual response curve. As noted in the background section, this can be done either through supplying the parameters required to compute the actual curve $\Gamma$ or, for a digitized input signal, by using lookup table to supply each input value with a corresponding $\Gamma$ value. Thus, for n-bit color, each of the $2^n$ possible input values would require an n-bit output value, or a total $2^n \times n$ bits for each color. The amount of memory space this requires for 10-, or even 8-, bit color is sizable.

To reduce these memory requirements, the present inventions employs a reduced, $2^m \times n$ lookup table, where n>m, which maintains n-bit resolution for the output values, but only resolves the input values to the m most significant bits of the full, n-bit value of $R_{in}$. The actual value of $\Gamma(R_{in})$ is then approximated by using the remaining l=(n−m) least significant bits of $R_{in}$ to interpolate.

Point 200 shows the value of $R_{in}$ for just its m most significant bits, M<(m−1):0>, and its corresponding value on the curve, $\Gamma(M)$, at the point 241. The next value, in terms of the m most significant figures, is M<(m−1):0>+1 and is shown at point 220. In terms of the full, n-bit resolution of input signal $R_{in}$<(n−1):0>, M corresponds to the value of $R_{in}$ with the l least significant bits ignored, and M+1 is this value plus $2^l$; but when just the m most significant bits are looked at, M and M+1 are consecutive values with $R_{in}$ between them. $\Gamma(M+1)$, point 221, is then the point on the response curve corresponding to M+1 and $\Gamma(R_{in})$ lies between $\Gamma(M)$ and $\Gamma(M+1)$ on this curve. The curve $\Gamma$ is then approximated between this pair of points by a straight line, $\Gamma'$. The approximate value of $\Gamma(R_{in})$, $\Gamma'(R_{in})$, is shown at point 250 and is found by using the l least significant bits of $R_{in}$<(n−1):0>, L<(l−1):0>, and lies $L/2^l$ of the distance along $\Gamma'$:

$$\Gamma'(R_{in}) = \Gamma(M) + L \cdot (\Gamma(M+1) - \Gamma(M))/2^l \quad (A)$$

Of course, more values of $\Gamma(M)$ could be used to approximate the curve $\Gamma$, with (i+1) values needed for an approximation based on an $i^{th}$ degree polynomial. As with the choice of m relative to n, the choice of the degree for the approximation is a design decision—and one which is related to the choice of m—but, in most cases, a linear interpolation is adequate.

FIG. 3 is a flow chart describing how the device of FIG. 1 performs the steps described with respect to FIG. 2. Again, this is only given for a single color, in this case red, with similar concurrent steps being executed in gamma correction units for the other colors. In step 300, the graphics engine or TV decoder supplies the n-bit input signal $R_{in}$<(n−1):0>. This signal is then decomposed into its m most significant bits, M<(m−1):0>, and its l least significant bits, L<(l−1):0>, in step 310.

Next, a $2^m \times n$ lookup table is used in step 320. Every cycle, the hardware reads two consecutive memory locations, starting from where the lookup table M is pointing. This provides the n-bit gamma corrected values for both M and M+1 as m-bit input addresses. Note that although both of the input addresses M and M+1 are only m-bit values, the corresponding read values of $\Gamma(M)$ and $\Gamma(M+1)$ have n-bits. The look up table has been previously loaded with the values for $\Gamma$. In a TV application, these would be programmed by the digital television controller to the values chosen by the manufacturer. For a computer application, the values could be supplied from ROM or other memory sources.

Finally, in step 330 the n-bit, gamma corrected value of $R_{out}$<(n−1):0>$\Gamma'(R_{in})$ is computed. First, the difference of the two read values is computed, divided by $2^l$, and multiplied by L. The result is added to the value pointed to by M. This results in the direct linear interpolation described above with respect to FIG. 2:

$$\Gamma'(R_{in}) = (1-\alpha)\Gamma(M) + \alpha\Gamma(M+1), \text{ where } \alpha = L/2^l. \quad (A')$$

Of course, when L=0, this result is exact. The choice of l and m relative to n is a design decision that can vary depending on the type of CRT for which the design is made. As noted above, for the choice of a relatively large l in order to save on memory size, a higher approximation to the gamma correction curve can be employed.

Before returning to give a fuller description of FIG. 1, a brief numerical example is given. Consider 10-bit color decomposed into 8 most significant bits and 2 least significant bits. In the notation of FIG. 2, let M<7:0>=$2^6$=64 and L<1:0>=3 (corresponding to an original value of $R_{in}$<9:0>= $2^{6+2}$+3=259). The input addresses into the lookup table will then be Add=M=64 and (Add+1)=(M+1)=65. The lookup table then supplies the two 10-bit output values, which have been programmed to, say, the respective (decimal) values of $\Gamma(M)$=360 and $\Gamma(M+1)$=420. The output value is then $$R_{out} = \Gamma'(R_{in}) = \Gamma(M) + L \cdot (\Gamma(M+1) - \Gamma(M))/2^l = 360 + 3 \cdot (420-360)/4 = 405.$$

Returning to FIG. 1, the various blocks of this figure perform the steps described with respect to FIGS. 2 and 3. Graphics engine or TV decoder DEC 100 supplies the n-bit R, G, and B color signals to their respective gamma correction circuits. The box $\Gamma_{red}$ 150 indicates the R gamma correction block only, with the similar G and B blocks suppressed to keep the diagram simple. Inside the gamma correction circuit $\Gamma_{red}$ 150, the input signal $R_{in}$<(n−1):0> is broken down into its m most significant bits and l=(n−m) least significant bits. Block MSB 110 skims off the most significant bits to form M<(m−1):0>=$R_{in}$<(n−1):(n−m)> and also form M+1. As it must produce and pass on two such values as addresses to the lookup table for each single value of $R_{in}$, it is incremented with twice the clock speed, $\phi$, at which the least significant bit values are supplied. This is indicated by the 2$\phi$ input on FIG. 1.

The m-bit values M and M+1 then serve as the input addresses for the $2^m \times n$ lookup table LUT 120. Add<(m−1):0>=M<(m−1):0> and its adjacent value point to the respective n-bit values of $\Gamma(Add)$<(n−1):0> and $\Gamma(Add+1)$<(n−1):0>. This pair of values then go to R-OUT 130 to be combined with the least significant bits to form the output values. The n-bit gamma corrected output then leaves $\Gamma_{red}$ 150 for conversion to analog, upsampling, or any other desired post-processing.

In a TV application, lookup table LUT 120 would be programmable along 140 by a digital television controller which is not shown in FIG. 1. A common implementation would then store the lookup table values in RAM within LUT 120. In more general applications, such as for use with a computer monitor, the lookup table values could be entered from the computer's ROM or other memory source and may be stored separately.

In R-OUT 130, the l least significant bits of $R_{in}$ are received as L<(l−1):0>=$R_{in}$<(l−1):0>. The difference $\Gamma(Add+1)-\Gamma(Add)$ is formed and then divided by $2^l$. The result corresponds to the slope of line $\Gamma'$ in FIG. 2, as a difference of $2^l$ seen from an (m+l)-bit view point is equivalent to 1 from an m-bit view point. This result is then multiplied by L and added to $\Gamma(Add)$ to produce $R_{out}$<(n−1):0>, the n-bit gamma corrected value of $R_{in}$<(n−1):0> as given in equation (A) above:

$$R_{out}<(n-1):0> = L \cdot (\Gamma(Add) - \Gamma(Add+1))/2^l + \Gamma(Add).$$

In this way, a full, n-bit gamma corrected output signal can be obtained for an n-bit input signal without requiring a complete $2^n \times n$ lookup table for each color. This decreases the required memory space by a factor of $2^l$ while adding only a minimal amount of increased computation. The described calculations can either be performed in hardware or by software used, for example, in the controller. As gamma correction curves tend to be relatively smooth, in most cases the described linear interpolation embodiment introduces negligible error. Thus, for example, using only the 8 most significant bits for 10-bit color—or only the 6 most significant bits for 8-bit color—results in a quarter of the memory requirements, while using only the 6 most significant bits for 10-bit color would reduce in a reduction by a factor of 16. In this way, even higher color resolution, of say 12-bits, can be obtained while still only requiring a tractable amount of memory.

Various details of the implementation and method are merely illustrative of the invention. It will be understood that various changes in such details may be within the scope of the invention, which is to be limited only by the appended claims.

What is claimed is:

1. A method for the gamma correction of an n-bit video signal, comprising:

separating the n-bit video signal into an m-bit most significant bit portion and an l-bit least significant bit portion, where n=m+l and n is greater than m;

forming a first gamma corrected value by gamma correcting said m-bit most significant bit portion to n-bit accuracy;

forming a second gamma corrected value by gamma correcting M+1 to n-bit accuracy, where M is said m-bit most significant bit portion; and approximating the n-bit accuracy gamma corrected n-bit video signal by interpolating between said first and second gamma corrected values by said l-bit least significant bit portion.

2. The method of claim 1, wherein the forming of said first and second gamma corrected values is done through use of a look up table.

3. The method of claim 2, wherein said look up table is a $2^m \times n$ look up table.

4. The method of claim 2, additionally comprising:

programming said lookup table with values prior to forming said gamma corrected values.

5. The method of claim 1, wherein said interpolating is by a linear interpolation.

6. The method of claim 5, wherein said linear interpolation is given by the formula $$\Gamma'(R_{in}) = \Gamma(M) + L \cdot (\Gamma(M+1) - \Gamma(M))/2^l$$

where M is said m-bit most significant bit portion, $\Gamma(M)$ is said first gamma corrected value, $\Gamma(M+1)$ is said second gamma corrected value, L is said l-bit least significant bit portion, and $\Gamma'(R_{in})$ is said n-bit accuracy gamma corrected n-bit video signal.

7. The method of claim 1, wherein said video signal is one of a R, G, or B signal.

8. A gamma correction circuit comprising:

a decoder providing an n-bit video signal;

a correction unit that receives the m-bit most significant bit portion of said n-bit video signal and derives therefrom a plurality of n-bit gamma corrected video signals, wherein n is greater than m; and an output circuit that receives the l=(n−m)-bit least significant bit portion of said n-bit video signal and said plurality of n-bit gamma corrected video signals, wherein said output circuit produces an n-bit output video signal derived from said plurality of gamma corrected video signals by interpolating by said least significant bit portion.

9. The gamma correction circuit of claim 8, wherein said correction unit derives said plurality of n-bit gamma corrected video signals from values loaded in a look up table.

10. The gamma correction circuit of claim 9, wherein said values are loaded by programming said lookup table.

11. The gamma correction circuit of claim 10, additionally comprising:

a controller, where said values are loaded by the controller programming said lookup table.

12. The gamma correction circuit of claim 9, wherein said lookup table contains a RAM memory for storing said values.

13. The gamma correction circuit of claim 9, wherein said look up table is a $2^m \times n$ look up table.

14. The gamma correction circuit of claim 8, wherein the number of said plurality of said n-bit gamma corrected video signals is two.

15. The gamma correction circuit of claim 14, wherein said correction unit incremented at twice the clock speed with which the decoder supplies said video signal.

16. The gamma correction circuit of claim 14, wherein said interpolating is by a linear interpolation.

17. The gamma correction circuit of claim 16, wherein the first of said two gamma corrected values is formed by gamma correcting said m-bit most significant bit portion to n-bit accuracy, and the second of said two gamma corrected values is formed by gamma correcting M+1 to n-bit accuracy, where M is said m-bit most significant bit portion.

18. The gamma correction circuit of claim 17, wherein said linear interpolation is given by the formula $$\Gamma'(R_{in}) = \Gamma(M) + L \cdot (\Gamma(M+1) - \Gamma(M))/2^l$$

where M is said m-bit most significant bit portion, $\Gamma(M)$ is the said first gamma corrected value, $\Gamma(M+1)$ is said second gamma corrected value, L is said l-bit least significant bit portion, and $\Gamma'(R_{in})$ is said n-bit output video signal.

19. The gamma correction circuit of claim 8, wherein said video signal is one of a R, G, or B signal.

* * * * *